United States Patent [19]

Newman et al.

[11] Patent Number: 4,932,367
[45] Date of Patent: Jun. 12, 1990

[54] FOUR-STROKE V-ENGINE WITH CENTRAL EXHAUST AND INTAKE MANIFOLDS

[75] Inventors: Neil A. Newman, Omro; Herbert A. Bankstahl; Wayne T. Beck, both of Fond du Lac, all of Wis.; Anthony L. Debates, Redford, Mich.

[73] Assignee: Brunswick Corporation, Skokie, Ill.

[21] Appl. No.: 221,722

[22] Filed: Jul. 20, 1988

[51] Int. Cl.$^5$ .............................................. F02M 35/00
[52] U.S. Cl. ............................. 123/52 MV; 123/55 VE
[58] Field of Search ........ 123/52 MV, 55 MF, 55 VS, 123/55 VE, 52 M, 52 MC

[56] References Cited

U.S. PATENT DOCUMENTS

| | | | |
|---|---|---|---|
| 1,862,723 | 6/1932 | Summers | 123/52 MV |
| 2,263,034 | 11/1941 | Fiedler | 123/90.61 |
| 2,346,737 | 4/1944 | Essl | 123/90.61 |
| 2,523,611 | 9/1950 | Clayton . | |
| 2,686,506 | 8/1954 | Carpentier et al. . | |
| 2,704,057 | 3/1955 | Randol | 123/90.59 |
| 2,771,863 | 11/1956 | Porsche et al. . | |
| 3,802,399 | 4/1974 | Miyake et al. | 123/52 MV |
| 3,969,893 | 7/1976 | Sakurai et al. . | |
| 3,994,129 | 11/1976 | Sakurai et al. | 123/52 MV |
| 4,184,462 | 1/1980 | Hale . | |
| 4,244,332 | 1/1981 | Kusche et al. . | |
| 4,258,687 | 3/1981 | Mauch et al. | 123/52 MV |
| 4,266,514 | 5/1981 | Tyner . | |
| 4,346,676 | 8/1982 | Tyner . | |
| 4,513,698 | 4/1985 | Senga et al. . | |
| 4,817,566 | 4/1989 | Newman | 123/52 MV |
| 4,829,942 | 5/1989 | Ampferer | 123/52 MV |

FOREIGN PATENT DOCUMENTS 651848  2/1929  France .
518518  2/1940  United Kingdom .

OTHER PUBLICATIONS

"Plymouths with Ram Induction", 1959, p. 305, Oct. 14, 1959.
"The Scientific Design of Exhaust and Intake Systems", Philip H. Smith, 1962.

Primary Examiner—David A. Okonsky
Attorney, Agent, or Firm—Andrus, Sceales, Starke & Sawall

[57] ABSTRACT

A V-type four-stroke cycle internal combustion engine is provided with an exhaust manifold and an air intake manifold disposed in the valley of the V-engine, and arranged one above the other. The exhaust from the cylinders passes through exhaust passages formed in the cylinder heads which discharge exhaust into the valley of the V-engine for collection in a central exhaust cavity provided in the exhaust manifold. A single exhaust discharge outlet is in communication with the central exhaust cavity for discharging exhaust therefrom. The air intake manifold includes a series of air intake passages which supply air to the cylinders from within the valley of the V-engine. A series of cylinder head intake passages are provided with openings facing the valley of the V-engine for receiving air therefrom. The exhaust manifold is preferably water jacketed for cooling exhaust prior to its discharge from the engine, and the exhaust passages provided in the cylinder heads are also water jacketed. In a carbureted system, the water warmed by the exhaust acts to pre-heat air passing through the cylinder head air passages prior to its entry into the cylinders, which improves low-speed performance of the engine. The push rods are either disposed in a conventional arrangement wherein the cam shaft is located in the apex of the V-shape formed by the push rods, or may be disposed in an overhead arrangement when an overhead camshaft configuration is employed.

23 Claims, 3 Drawing Sheets

FOUR-STROKE V-ENGINE WITH CENTRAL EXHAUST AND INTAKE MANIFOLDS

BACKGROUND AND SUMMARY

This invention relates to a V-type internal combustion engine, and more particularly to a V-engine for use in a marine propulsion system.

It has been found that placing a central exhaust manifold in the valley of a V-engine can substantially reduce the engine package size, as well as reduce stresses caused by mounting exhaust manifolds to the cylinder heads. Such a configuration is disclosed in copending patent application Ser. No. 07/118,863 filed Nov. 9, 1987. The disclosure of this copending application involves the use of induction pipes for introducing the air-fuel mixture to the engine from a point outside the valley of the V-engine. Upon proper selection of the length of the induction pipes, induction tuning can be achieved to boost the power output of the engine.

It has been found that further efficiencies can be achieved in the packaging of a V-engine by both providing air to the intake ports of the cylinders from within the valley of the V-engine, as well as by passing exhaust from the cylinders into the valley of the V-engine. The present invention is directed to a V-engine packaging for achieving such efficiencies. In accordance with the present invention, a four-stroke cycle V-engine includes a pair of cylinder banks, each of which has a plurality of cylinders. The cylinder banks are slanted with respect to each other to form a V-engine configuration. The upper end of each cylinder has an intake port for receiving an air-fuel mixture and an exhaust port for allowing exhaust to pass from the cylinder. Air intake means is disposed in the valley of the V-engine, and is in communication with the cylinder intake ports for supplying air thereto from within the valley of the V-engine. Exhaust collection means is also disposed in the valley of the V-engine. The exhaust collection means is in communication with the cylinder exhaust ports for passing exhaust therefrom. In one embodiment, the air intake means comprises an air intake manifold having a central air manifold and a plurality of passages which communicate between the central air cavity and the air intake ports. The exhaust collection means comprises an exhaust manifold having a central exhaust collection cavity and a single discharge at an end thereof. A plurality of exhaust passages are provided for communicating between the cylinder exhaust ports and the central exhaust collection cavity. The air intake manifold and the exhaust manifold are preferably disposed one above the other in the valley of the V-engine. In a preferred embodiment, the exhaust manifold is disposed below the air intake manifold. The exhaust manifold, as well as the exhaust passages, are preferably water jacketed to cool exhaust prior to its discharge from the central exhaust cavity of the exhaust manifold. With such water jacketing of the exhaust manifold, positioning the exhaust manifold below the air intake manifold places the heavier of the two components lower, thereby maintaining a low center of gravity for the engine package.

The invention also contemplates the provision of either a conventionally located cam shaft for operating the rocker arms which control the position of the valves for the intake and exhaust ports, or an overhead arrangement for the cam shaft.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
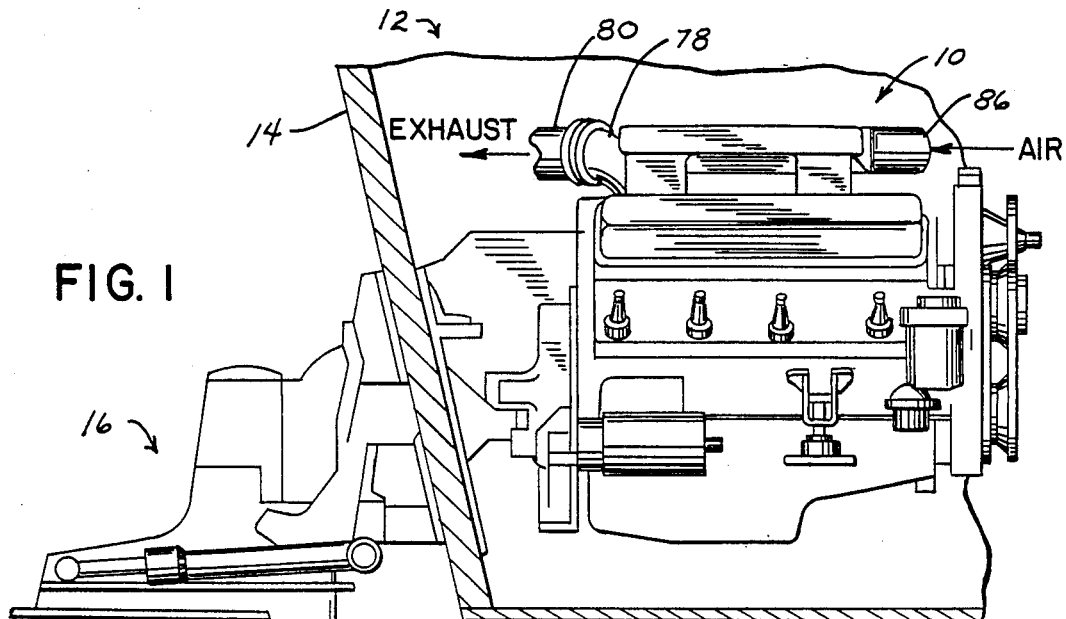
FIG. 1 is a partial side elevation view of an inboard/outboard marine stern drive propulsion system utilizing a V-type engine constructed according to the present invention.

As shown in FIG. 1, a stern drive marine propulsion system includes an engine 10 provided in the rear end of a boat 12 adjacent its transom 14. A transmission 16 is interposed between engine 10 and propeller 18, as is well known.

Figure 2:
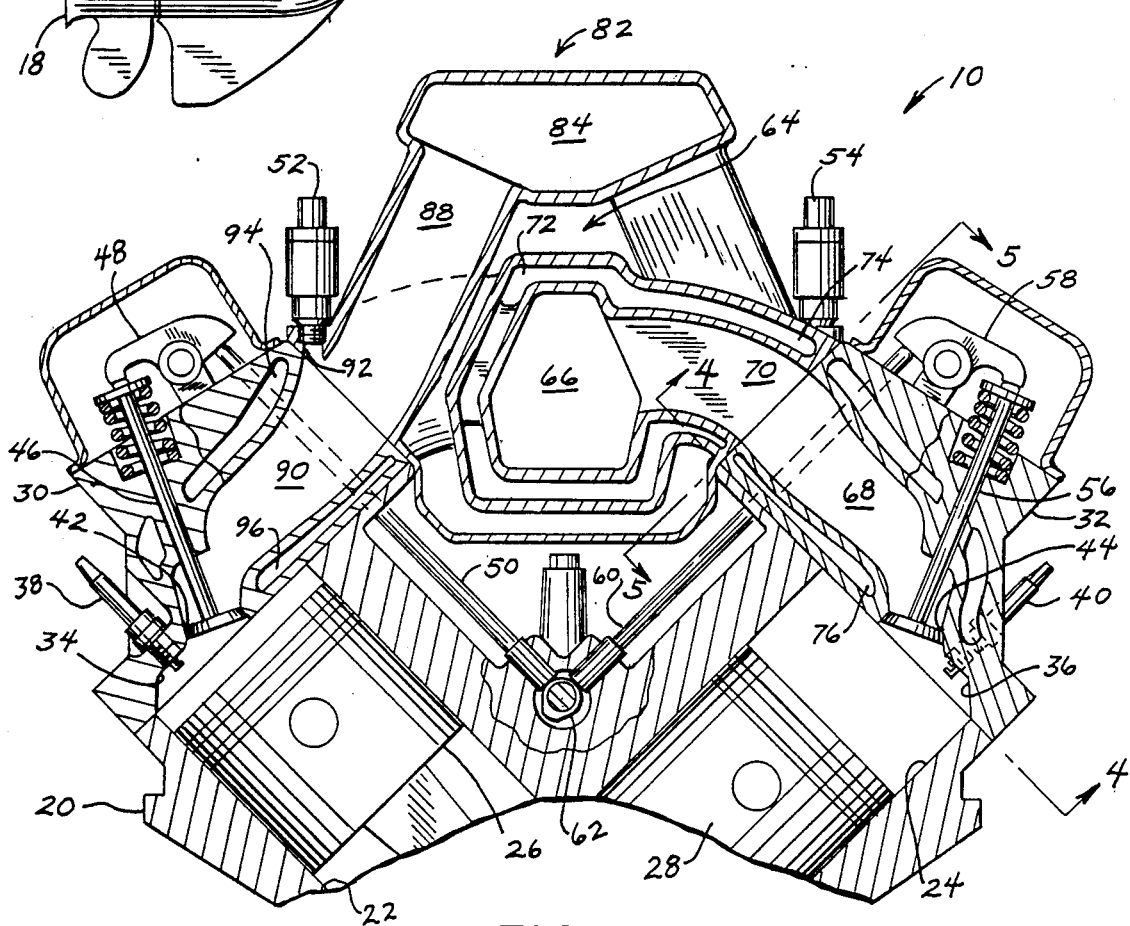
FIG. 2 is a cross sectional view of the V-engine of the invention, taken generally along line 2—2 of FIG. 3.

With reference to FIG. 2, engine 10 generally includes a block 20 having a series of integrally formed cylinders, two of which are shown at 22, 24. Cylinders 22, 24 are representative of other cylinders formed in line therewith. Cylinders 22, 24 are disposed in block 20 so as to be slanted in opposite directions with respect to each other, to form a V-type engine as is well known. Cylinders 22, 24 include mating pistons 26, 28, respectively, which are connected by means of connecting rods to a crankshaft disposed at the apex of the V-engine, also as is known. A pair of cylinder heads 30, 32 are connected to block 20 adjacent the upper ends of cylinders 22, 24. Block 20 and cylinder heads 30, 32 form a V-configuration having a central valley.

Combustion chambers 34, 36, are provided at the upper end of cylinders 22, 24, respectively, and spark plugs 38, 40 are connected to block 20 adjacent combustion chambers 34, 36, as is well known. Each cylinder is provided at its upper end adjacent its combustion chamber with an intake port and an exhaust port; as shown, an intake port 42 is provided at the upper end of cylinder 22 adjacent combustion chamber 34, and an exhaust port 44 is provided at the upper end of cylinder 24 adjacent combustion chamber 36.

An intake valve 46 seals intake port 42 from combustion chamber 34 during the exhaust, compression and firing sequences. Valve 46 is selectively moved downwardly by a pivotable rocker 48, to which one end of a push rod 50 is connected, at preselected intervals to permit an air-fuel mixture to flow into cylinder 22 for ignition by spark plug 38, as is well known. As shown, fuel injectors such as 52, 54 are provided for injecting fuel prior to entry of the air-fuel mixture into combustion chamber 34 through intake port 42.

Exhaust port 44 is sealed from combustion chamber 36 by a valve 56 during the intake, compression and firing sequences. Valve 56 is selectively moved downwardly by a pivotable rocker 58, to which one end of a push rod 60 is conneeted, at preselected intervals to exhaust the products of combustion from cylinder 24.

As shown, push rods 50 and 60 are each drivingly connected to a cam shaft 62 mounted in block 20, which controls the movement of rockers 48, 50 and thereby the position of valves 46, 56, respectively. As shown, push rods 50, 60 are substantially parallel to the cylinder banks, with cam shaft 62 being disposed at the apex of the V-shape formed thereby.

In accordance with the invention, an exhaust manifold 64 is disposed in the valley of V-engine 10. Exhaust manifold 64 includes a central exhaust collecting cavity 66. Passages are formed in the cylinder heads, such as passage 68 in cylinder head 32, to allow exhaust gases to pass from the cylinders through the cylinder heads to exhaust collecting cavity 66 in manifold 64. Manifold 64 further includes a series of manifold exhaust passages, such as shown at 70, in communication with the cylinder head exhaust passages, such as shown at 68, for passing exhaust gas therefrom to cavity 66.

Exhaust manifold 64 includes a water jacket 72 provided around exhaust cavity 66, and a water jacket 74 around manifold exhaust passage 70. A water jacket 76 is provided in cylinder head 32 around cylinder head exhaust passage 68. As is known, water jackets 72–76 are a part of the engine cooling system. A fluid, such as water, is circulated through the engine cooling system to cool the various components of the engine. Water jackets 72–76, which surround the exhaust-collecting areas of cylinder head 32 and exhaust manifold 64, act to absorb heat from the exhaust contained therein prior to the exhaust being discharged from exhaust collecting cavity 66.

With reference to FIG. 1, an exhaust discharge outlet 78 is provided at the rearward end of exhaust manifold 64. Exhaust discharge outlet 78 is positioned so as to be substantially in line with the valley of engine 10 and the longitudinal axis of exhaust collecting cavity 66. An exhaust pipe 80 is connected to exhaust discharge outlet 78, and preferably routes the exhaust in a known manner so as to ultimately discharge the exhaust through the hub of propeller 18.

Figure 4:
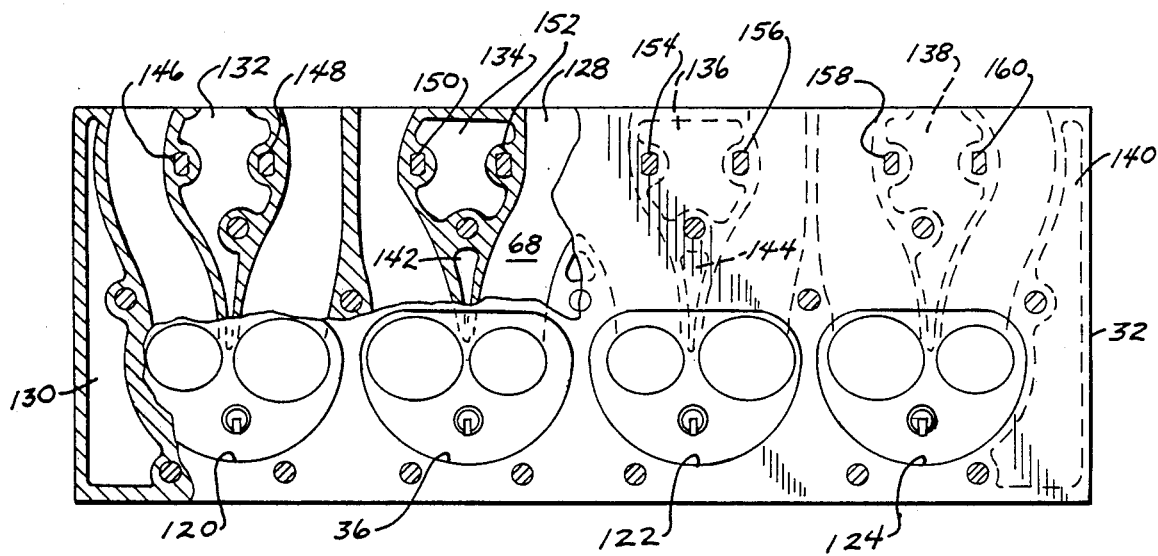
FIG. 4 is a partial sectional view taken generally along line 4—4 of FIG. 2.

An intake manifold 82 is mounted in the valley of V-engine 10 above exhaust manifold 64. Intake manifold 82 includes a central air intake cavity 84 which receives intake air from an air inlet 86 (FIGS. 1, 4). Intake manifold 82 includes a series of intake passages, one of which is shown at 88, which communicate between air intake cavity 84 and a series of cylinder head air intake passages, one of which is shown at 90. Cylinder head air intake passage 88 is normally in communication with combustion chamber 34, and valve 46 acts to open or close communication therebetween. With the construction shown, air is supplied to the cylinders from within the valley of V-engine 10.

Fuel injector 52 is mounted within a fuel injection port 92 which is in communication with manifold intake passage 88 and cylinder head air intake passage 90, for supplying fuel to the air prior to its entry into combustion chamber 34. In this manner, a satisfactory air-fuel mixture can be furnished for ignition by spark plug 38. As an alternative, a carburetion system may be employed for supplying the air-fuel mixture to the cylinders.

Water jackets 94, 96 are provided above and below cylinder head air intake passage 90, and engine coolant is circulated therethrough. With the construction as shown, the fluid circulating through water jackets 94, 96, which absorbs heat from the engine exhaust, also acts to pre-heat air within cylinder head air intake passage 90 prior to its entry into combustion chamber 34. Such pre-heating of the intake air in cylinder head air intake passage 90 enhances engine performance at low-speed operation when a carburetor system is used in place of the fuel injection system shown.

With the construction shown in FIG. 2, air intake manifold 82 is mounted above exhaust manifold 64. In this manner, the weight of exhaust manifold 64 attributable to its water jacketing is as low as possible. This maintains a relatively low center of gravity for the engine package.

Figure 3:
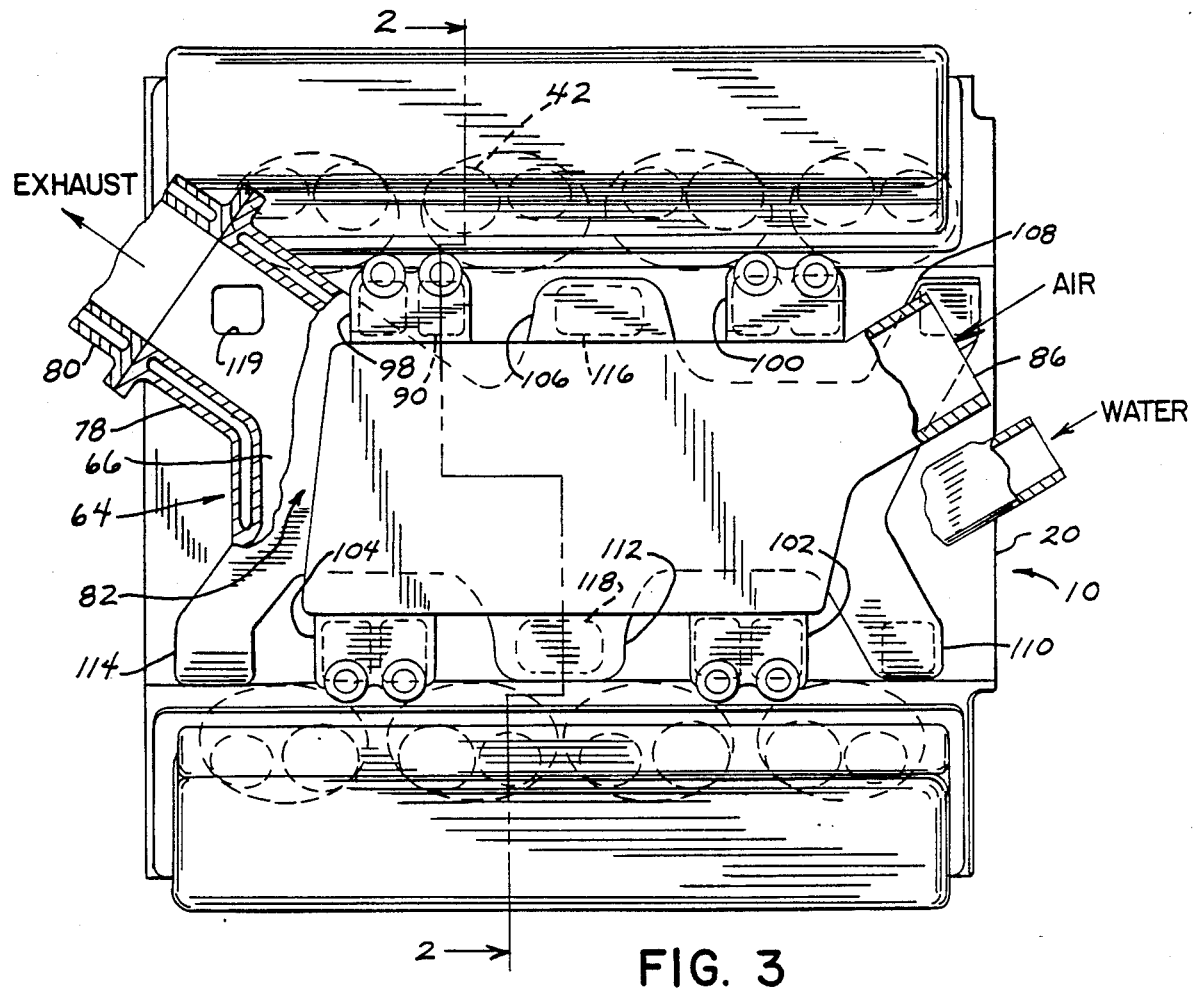
FIG. 3 is a top plan view of a V-engine constructed according to the invention.

FIG. 3 illustrates a top plan view of engine 10. As shown therein, air intake manifold 82 is provided on each side with a pair of air intake branches, shown at 98, 100, 102, 104. Each of air intake branches 98–104 houses a pair of air intake passages, such as 90.

Exhaust manifold 64 is provided with a series of branches, such as shown at 106, 108, 110, 112, 114. As shown, centrally disposed exhaust branches 106, 112 each house a trunk exhaust passage, 116, 118, respectively, which communicates with exhaust discharge ports from the middle two cylinders of the cylinder bank. The end exhaust branches, such as 108, 110 and 114, each communicate with the exhaust discharge port from the end cylinders in the line of cylinders in each cylinder bank. An exhaust passage 119 discharges exhaust from the upper left cylinder directly into exhaust discharge outlet 78.

FIG. 4 illustrates the construction of cylinder head 32 and the air intake and exhaust passages disposed therein. As shown, cylinder head 32 includes a series of combustion chambers 120, 36, 122 and 124 disposed in its lower face which are positioned over the respective cylinders provided in the cylinder bank. Each of combustion chambers 120, 36, 122, 124 includes an intake port and an exhaust port which communicate between the cylinders and the cylinder head intake and exhaust passages. As shown, end chambers 120, 124 are each provided with branching intake and exhaust passages which communicate with the appropriate intake and exhaust passage provided in intake manifold 82 and exhaust manifold 64. Central chambers 36, 122 include outer intake ports which communicate with a separate intake branch passage, and a pair of exhaust ports which communicate with branch exhaust passages which merge into a central trunk passage, shown at 128.

With further reference to FIG. 4, a plurality of water jacket passages are formed throughout cylinder head 32. As shown, water jacket cavities are shown at 130, 132, 134, 136, 138, 140, 142, 144. As mentioned above, water jackets 130–144 both absorb heat from exhaust passing through each exhaust passage, and act to warm air passing through each air intake passage for pre-heating air prior to its entry into the cylinders when used with a carbureted system. Push rod cavities, shown at 146, 148, 150, 152, 154, 156, 158 and 160, are formed adjacent water jacket cavities 132–138 for housing push rods.

Figure 5:
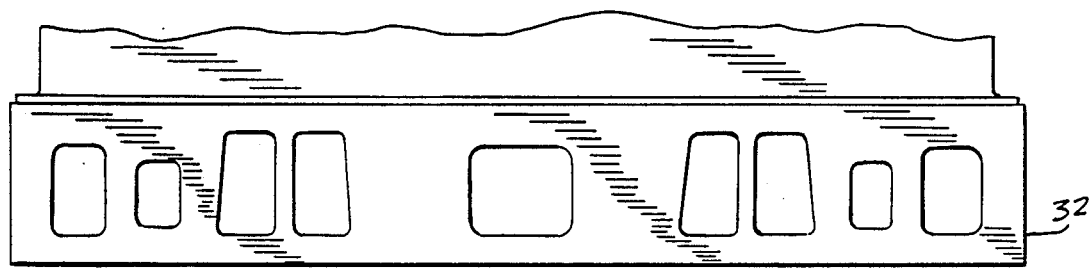
FIG. 5 is a partial sectional view taken generally along line 5—5 of FIG. 2.

FIG. 5 shows the arrangement for the air intake and exhaust discharge ports for cylinder head 32. The respective intake and exhaust ports correspond to the arrangement of the air intake and exhaust passages shown for cylinder head 32 in FIG. 4.

Figure 6:
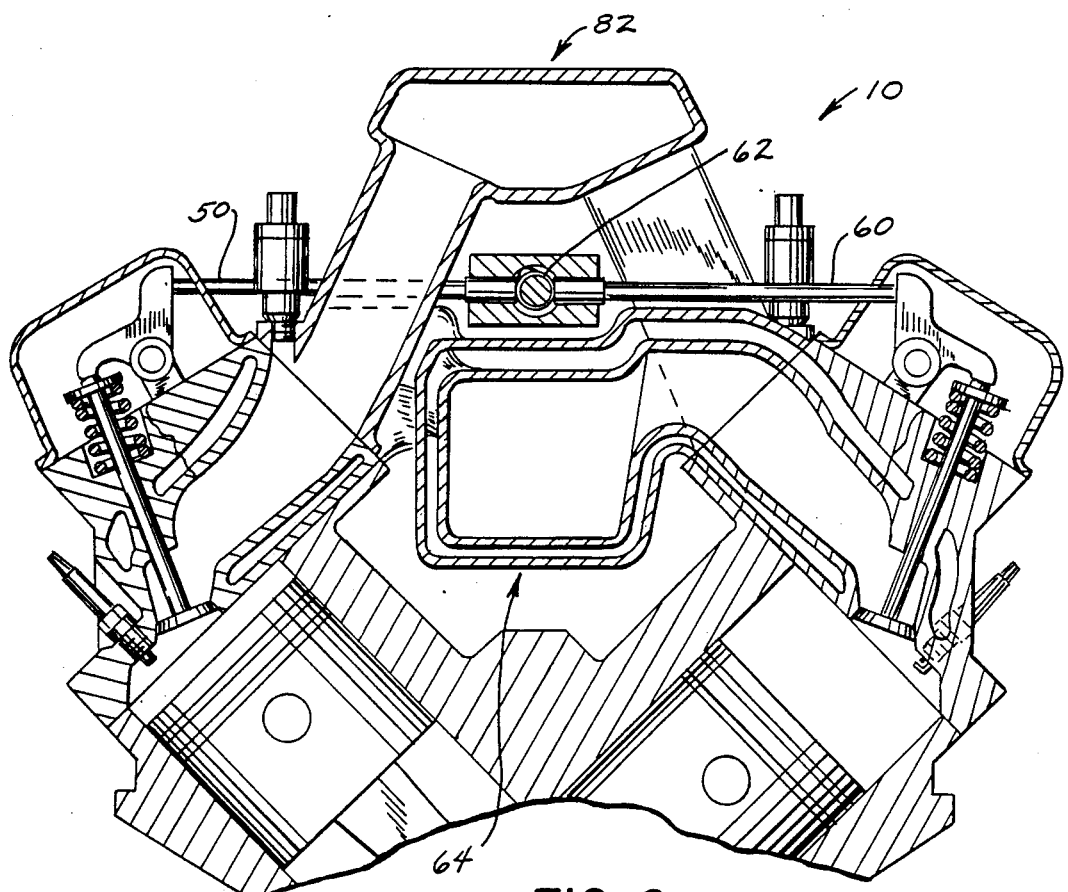
FIG. 6 is a view similar to FIG. 2, showing an overhead cam shaft arrangement for the V-engine of the invention.

FIG. 6 shows an alternate construction for V-engine 10 of the invention. As shown, exhaust manifold 64 is somewhat lowered with respect to the arrangement of manifold 64 as shown in FIG. 2. Intake manifold 82 is somewhat raised, with the length of the intake branches being somewhat longer than that of the configuration shown in FIG. 2. In this manner, space is provided between intake manifold 82 and exhaust manifold 64 in which cam shaft 62 is disposed. With this construction, an overhead cam arrangement is provided. Push rods 50, 60 are disposed so as to be substantially horizontal, and are colinear. Apart from the disposition of push rods 50, 60, the remainder of the components of V-engine 10 are arranged substantially identically to the arrangement of FIG. 2. This configuration of engine 10 allows the size of the intake and/or exhaust ports to be increased due to removal of the push rod cavities from the cylinder head. The push rod cavities thus do not constrain the area and path of the intake and/or exhaust passages.

Various alternatives and modifications are contemplated as being within the scope of the following claims particularly pointing out and distinctly claiming the invention.

We claim:

1. A four-stroke cycle V-engine, comprising:
   a pair of cylinder banks each having one or more cylinders, said cylinder banks being slanted with respect to each other to form a V-engine configuration, with said cylinders each having an intake port for receiving an air-fuel mixture and an exhaust port for allowing exhaust to pass from said cylinders;
   air intake means disposed in the valley of said V-engine, said air intake means being in communication with the cylinder intake ports for supplying air thereto from within the valley of said V-engine;
   exhaust collection means disposed in the valley of said V-engine, said exhaust collection means being in communication with the cylinder exhaust ports for passing exhaust therefrom; said exhaust collection means being located beneath said air intake means and
   wherein said air intake means and said exhaust collection means are spaced so as to be not in contact with each other to provide an ambient air area therebetween to prevent heating of air within said air intake means by exhaust in said exhaust collection means.

2. The V-engine according to claim 1, wherein said exhaust collection means comprises an exhaust manifold disposed in the valley of said V-engine and having a plurality of passages in communication with the cylinder exhaust ports.

3. The V-engine according to claim 2, wherein an exhaust passage is disposed adjacent to the upper end of each cylinder and in communication with said plurality of manifold passages for passing said exhaust from said cylinder exhaust ports.

4. The V-engine according to claim 2, wherein said exhaust manifold includes a single exhaust discharge outlet.

5. The V-engine according to claim 2, further comprising a cooling jacket for circulating a cooling fluid around said exhaust manifold for cooling exhaust contained therein prior to discharge, and wherein said ambient area is provided between said cooling jacket and said air intake means.

6. The V-engine according to claim 1, wherein said air intake means comprises an air intake manifold disposed in the valley of said V-engine and including a plurality of passages in communication with the cylinder intake ports.

7. The V-engine according to claim 6, wherein an intake passage is disposed adjacent the upper end of each cylinder and in communication with said plurality of manifold passages for passing air to said intake ports.

8. The V-engine according to claim 6, further comprising fuel injection means disposed upstream of each said intake port for introducing fuel to air prior to entry into said cylinders through said intake ports.

9. The V-engine according to claim 6, further comprising carburetion means disposed upstream of each said intake port for mixing fuel with air to provide an air-fuel mixture into said cylinders through said intake ports.

10. In a V-type four-stroke cycle engine having a plurality of cylinders disposed in a pair of oppositely slanted cylinder banks to form a V-engine configuration, with said cylinders each having an intake port for allowing an air-fuel mixture to be introduced into said cylinders and an exhaust port for allowing exhaust to pass from said cylinders, the improvement comprising:
   exhaust collection means disposed in the valley of said V-engine for collecting exhaust passing from said cylinders through said exhaust ports;
   exhaust discharge means connected to said exhaust collection means for discharging said exhaust from said exhaust collection means;
   intake means disposed in the valley of said V-engine for introducing air to said cylinders from the valley of said V-engine; said exhaust collection means being located beneath said air intake means and
   wherein said intake means and said exhaust collection means are spaced so as to be not in contact with each other to provide an ambient air area therebetween to prevent heating of air within said air intake means by exhaust in said exhaust collection means.

11. The improvement according to claim 10, wherein said intake means comprises an intake manifold having a plurality of passages in communication with said cylinder intake ports, and wherein said exhaust collection means comprises an exhaust manifold having a plurality of passages in communication with said cylinder exhaust ports.

12. The improvement according to claim 11, wherein said intake manifold is disposed above said exhaust manifold in the valley of said V-engine.

13. The improvement according to claim 11, wherein a cylinder head is provided adjacent the upper ends of the cylinders in each said cylinder bank, and wherein each cylinder head includes a plurality of intake passages for communicating between said air intake manifold passage and said cylinder intake ports, and further includes a plurality of exhaust passages for communicating between said exhaust manifold passages and said cylinder exhaust ports.

14. The improvement according to claim 13, wherein said cylinder head intake and exhaust passages are disposed in a side by side relationship.

15. The improvement according to claim 13, wherein said intake manifold and said exhaust manifold are connected to said cylinder heads.

16. The improvement according to claim 10, further comprising a cooling jacket around said exhaust collection means for cooling exhaust contained within said exhaust collection means prior to discharge of said exhaust through said exhaust discharge means, and wherein said ambient area is provided between said cooling jacket and said intake means.

17. The improvement according to claim 16, wherein said exhaust collection means comprises an exhaust manifold having a central exhaust collection cavity and a plurality of exhaust passages for communicating between said central exhaust collection cavity and said cylinder exhaust ports, and wherein said cooling jacket comprises water jacket means surrounding said central exhaust collection cavity and said plurality of exhaust passages.

18. A four-stroke cycle V-engine, comprising:
a pair of cylinder banks each having a plurality of cylinders, said cylinder banks being slanted with respect to each other to form a V-engine configuration, with an intake port disposed adjacent each said cylinder for receiving an air-fuel mixture and an exhaust port disposed adjacent each said cylinder for allowing exhaust to pass from said cylinders;
an intake valve disposed in each said intake port and an exhaust valve disposed in each said exhaust port, each said intake and exhaust valve being operably connected to a pivotable rocker to which one end of a push rod is connected, each said push rod being connected at its other end to a rotatable cam shaft which controls the movement of said push rods and thereby the opening and closing of said intake and exhaust valves;
an air intake manifold disposed in the valley of said V-engine, said air intake manifold having a central air cavity and plurality of passages communicating between said central air cavity and said cylinder intake ports for introducing air to said air intake ports from within the valley of said V-engine;
an exhaust manifold disposed in the valley of said V-engine, said exhaust manifold having a central exhaust cavity and a plurality of passages communicating between said central exhaust cavity and said cylinder exhaust ports; said exhaust manifold located beneath said air intake manifold
wherein said intake manifold and said exhaust manifold are spaced so as to be not in contact with each other to provide an ambient air area therebetween to prevent heating of air within said intake manifold by exhaust in said exhaust manifold; and
said push rods being arranged so as to be substantially parallel to the cylinder banks and forming a V-shape, with said cam shaft being disposed at the apex of the V-shape formed by said push rods.

19. The V-engine according to claim 18, wherein said intake manifold and said exhaust manifold are disposed one above the other, and wherein said cam shaft is disposed below the lowermost of said intake and exhaust manifolds.

20. A four-stroke cycle V-engine, comprising:
a pair of cylinder banks each having a plurality of cylinders, said cylinder banks being slanted with respect to each other to form a V-engine configuration, with an intake port disposed adjacent each said cylinder for receiving an air-fuel mixture and an exhaust port disposed adjacent each said cylinder for allowing exhaust to pass from said cylinders;
an intake valve disposed in each said intake port and an exhaust valve disposed in each said exhaust port, each said intake and exhaust valve being operably connected to a pivotable rocker to which one end of a push rod is connected, each said push rod being connected at its other end to a rotatable cam shaft which controls the movement of said push rods and thereby the opening and closing of said intake and exhaust valves, said cam shaft being disposed in an overhead position outside the block of said engine;
an air intake manifold disposed in the valley of said V-engine, said air intake manifold having a central air cavity and a plurality of passages communicating between said central air cavity and said cylinder intake ports for introducing air to said air intake ports from within the valley of said V-engine;
an exhaust manifold disposed in the valley of said V-engine, said exhaust manifold having a central exhaust cavity and a plurality of passages communicating between said central exhaust cavity and said cylinder exhaust ports; said exhaust manifold being located beneath said air intake manifold and
wherein said intake manifold and said exhaust manifold are spaced so as to be not in contact with each other to provide an ambient air area therebetween to prevent heating of air within said intake manifold by exhaust in said exhaust manifold.

21. The V-engine according to claim 20, wherein said push rods are arranged so as to be substantially colinear.

22. The V-engine according to claim 21, wherein the push rods associated with each cylinder bank are disposed in a substantially horizontal plane.

23. The V-engine according to claim 20, wherein said exhaust manifold and said intake manifold are disposed one above the other, and wherein said overhead cam shaft is disposed between said exhaust manifold and said intake manifold.

* * * * *